Aug. 10, 1948.  A. H. HAWES  2,446,924
SCAFFOLDING
Filed Dec. 4, 1946
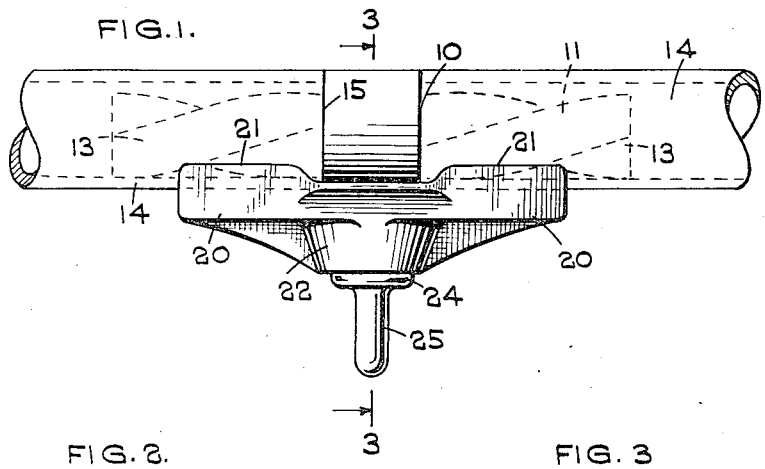
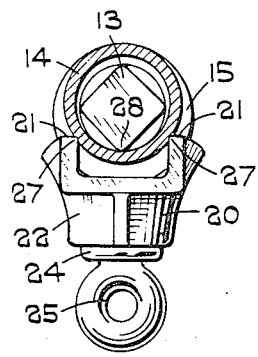
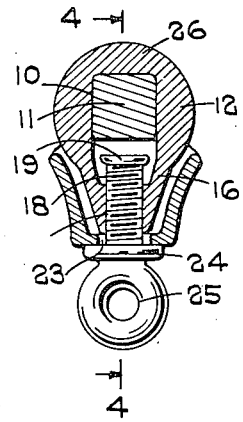
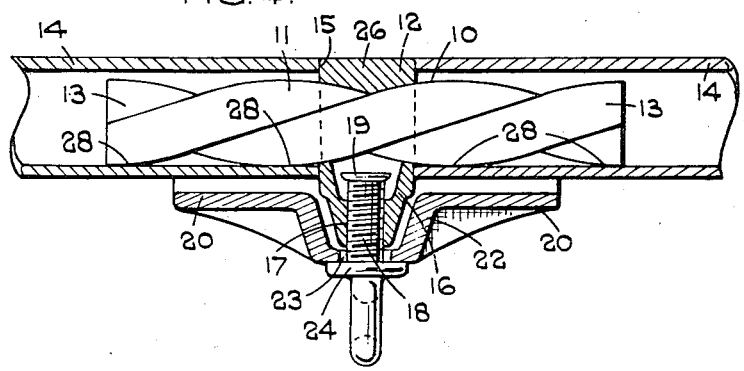
INVENTOR
Albert Henry Hawes
BY Harry J. Lucke
ATTORNEY.

Patented Aug. 10, 1948

2,446,924

UNITED STATES PATENT OFFICE 2,446,924

SCAFFOLDING

Albert Henry Hawes, Erdington, Birmingham, England, assignor, by mesne assignments, to Kwikform Limited, Small Heath, Birmingham, England, a British company Application December 4, 1946, Serial No. 713,869
In Great Britain December 19, 1945

5 Claims. (Cl. 287—2)

This invention relates to couplings for tubular scaffolding and is concerned with such couplings which are intended to connect scaffolding tubes in end-to-end relationship. The object of the invention is to provide a new or improved form of coupling which will secure the tubes together in a particularly rigid manner and which at the same time can very readily be operated by the user.

The invention is illustrated in the accompanying drawings, wherein:

Figure 1 is a side elevation of one form of coupling constructed in accordance with this invention and depicting two scaffolding tubes connected by the coupling in end-to-end relationship.

Figure 2 is an end view of the construction shown in Figure 1.

Figures 3 and 4 are cross sectional views on the line 3—3 of Figure 1 and 4—4 of Figure 3 respectively.

In the construction illustrated the coupling comprises a connecting element indicated generally at 10 which is formed by twisting a length of steel or other metal bar of polygonal section about its axis to provide, in effect, a multi-start helical screwthread having a very large pitch in relation to its diameter, such a form of bar being described in prior patent specification Serial No. 627,002, now abandoned.

This helically twisted bar which is shown more clearly at 11 in Figure 4, is provided with a collar 12 of internal formation corresponding to the exterior of the bar, which collar is screwed on to the bar so as to be centrally of the length thereof and is then welded to the bar so as to be secured permanently thereon with the ends of the bar projecting on each side of the collar to provide spigots 13 which are adapted each to enter one of the opposed ends 14 of the pair of tubes which it is desired to connect in end-to-end relationship.

The overall diameter of the twisted bar is made somewhat less than the internal diameter of the tubes so that the spigots can slide freely therein, the collar being of an increased diameter so that its end faces 15 provide shoulders which are adapted to abut against the opposite ends of the tubes.

The collar is provided at one side with a radially extending integral hollow boss 16 having a tapped hole 17 in which works a clamping screw 18, the inner end of which screw is provided with an enlarged head 19 for retaining the screw permanently on the collar, and mounted on the clamping screw is a clamping member 20 in the form of a saddle shaped length of metal, the member being of channel form in cross section as shown most clearly in Figure 2 so that only its longitudinal edges 21 are adapted to engage with the exterior of the two tubes.

The clamping member is formed centrally with an outwardly extending boss 22 having a hole 23 through which passes freely the clamping screw 18, the screw having on the outer side of the boss 22 a peripheral flange 24 for retaining the clamping member in position and being formed further with an integral eye 25 into which a tommy bar can be inserted to turn the screw.

The exterior of the hollow boss 16 and the interior of the boss 22 on the clamping member are coned correspondingly and sufficient clearance is provided between the coned surfaces to allow of the clamping member being tightened, while the threaded part of the clamping screw 18 is of a length such that this can be unscrewed a sufficient distance to allow the tube ends to be freely slidden on to or off the spigots 13 when the clamping screw head 19 engages with the inner end of the hollow boss 16.

In using the device for connecting two tubes in end-to-end relationship, the clamping screw is slackened to the maximum extent, the tube ends slidden on to the spigots 13 until they abut against the end faces 15 of the collar whereupon the screw is tightened. The dimensions of the parts are so chosen that the side of the collar 26 opposite to the clamping screw is flush with the exterior of the scaffolding tubes, which tubes are always of standard cross section. The device can therefore be used for connecting tubes in such manner as to present on the one side thereof a continuously flush surface for example to provide a hand rail or to provide a flush support for carrying battens to form a horizontal platform or staging.

By arranging for the longitudinal edges only of the channel section clamping member 20 to engage with the exterior of the tube ends a very good grip is obtained between the clamping member and the tubes so that they are held particularly securely in the desired end-to-end relationship while in the construction illustrated the inner longitudinal corners 27 of these edges are of right angled section and consequently are the only parts of the clamping member which engage with the exterior of the tubes, which right angle edges consequently bite into the metal of the tubes slightly, thereby giving a still more effective grip. If desired, these corner edges 27 may be serrated to still further improve the grip.

Furthermore in the construction actually described in which the spigots 13 are of polygonal section metal which has been twisted to form a helical screwthread, the spigots being of a diameter less than the internal diameter of the tube ends, such spigots will have substantially point contact with the interior of the tube, the points being indicated at 28 in Figure 4, and at these points owing to the intensity of the pressure between the spigots and the inner surfaces of the tubes, the metal of the latter is deformed very slightly in an outward direction to still further improve the grip between the clamping device and the tubes.

These points 28 are disposed substantially in line with one another along a line which is parallel to the longitudinal axis of the tubes so that with the construction actually described, the engagement between the coupling and the tubes is along three transversely spaced lines extending parallel to the longitudinal axis of the tubes, i. e. passing through the points indicated at 27, 28 and 27 in Figure 2 so that three point contact in a transverse plane is provided between the coupling and the tubes whereby the latter are gripped particularly effectively.

If desired, however, instead of making the spigots 13 from a bar of twisted polygonal section the spigots may be formed from any non-twisted polygonal section bar, for example, of square or hexagonal section while the bar, if desired, might be of cylindrical form either solid or tubular although the twisted polygonal section is preferred as providing a better grip between the coupling and the tubes.

What I claim then is:

1. A coupling for connecting a pair of scaffolding tubes in end-to-end relationship comprising a length of helically twisted polygonal metal bar, the ends of which are adapted each to enter one of the opposed ends of a pair of tubes to be connected, a collar secured permanently on the bar intermediate the ends thereof, a hollow boss on said collar integral therewith, said boss having a tapped hole, a clamping screw working in said hole, said clamping screw having an enlarged head on its inner end retaining it permanently on the collar, a clamping member having an outwardly extending central boss, said central boss having a hole in its outer end through which said clamping screw extends, said clamping member being of channel form in cross section and being adapted at its longitudinal edges only to engage with the tubes, a flange on the clamping screw for engaging the outer end of said clamping member boss, and a head on the screw adapted to be turned to rotate the screw and apply pressure to the clamping member and grip the tubes between the helically twisted bar and the longitudinal edges of the channel shaped clamping member.

2. A coupling for connecting a pair of scaffolding tubes in end-to-end relationship comprising a connecting element including a pair of oppositely directed spigots adapted each to enter one of the opposed ends of a pair of tubes to be connected, a collar permanently mounted on said connecting element intermediate said spigots, a hollow boss on said collar integral therewith, said boss having a tapped hole, a clamping screw working in said hole, said clamping screw having an enlarged head on its inner end retaining it permanently on the collar, a clamping member having an outwardly extending central boss, said central boss having a hole in its outer end through which said clamping screw extends, a flange on the clamping screw for engaging the outer end of said clamping member boss and a head on the screw for turning the same to apply pressure to the clamping member and grip the tubes between their respective spigots and the longitudinal edges of the channel shaped clamping member.

3. A coupling for connecting a pair of scaffolding tubes in end-to-end relationship comprising a length of helically twisted polygonal metal bar, the ends of which are adapted each to enter one of the opposed ends of a pair of tubes to be connected, a collar secured permanently on the bar intermediate the ends thereof, a hollow boss on said collar integral therewith, said boss having a tapped hole, a clamping screw working in said hole, said clamping screw having an enlarged head on its inner end retaining it permanently on the collar, a clamping member having an outwardly extending central boss, said central boss having a hole in its outer end through which said clamping screw extends, said clamping member being of channel form in cross section and being adapted at its longitudinal edges only to engage with the tubes, a flange on the clamping screw for engaging the outer end of said clamping member boss and a head on the screw adapted to be turned to rotate the screw and apply pressure to the clamping member and grip the tubes between the helically twisted bar and the longitudinal edges of the channel shaped clamping member, the coupling being adapted to engage the scaffolding tubes along three transversely spaced lines extending parallel to the longitudinal axis of the tubes, the longitudinal edges of the clamping member being adapted to engage the tubes along two outer lines and the twisted bar being adapted to engage the tubes along the intermediate line.

4. A coupling according to claim 1, wherein the exterior of the collar is adapted to be flush with the exterior of the tubes on the side thereof opposite to the clamping member so that said side presents a flush appearance.

5. A coupling according to claim 3, wherein the exterior of the collar is adapted to be flush with the exterior of the tubes on the side thereof opposite to the clamping member so that said side presents a flush appearance.

ALBERT HENRY HAWES.

REFERENCES CITED

The following references are of record in the file of this patent:

UNITED STATES PATENTS

| Number | Name | Date |
|---|---|---|
| 1,103,403 | Duckworth | July 14, 1914 |
| 1,661,868 | Armstrong et al. | Mar. 6, 1928 |

FOREIGN PATENTS

| Number | Country | Date |
|---|---|---|
| 617,672 | Germany | Aug. 23, 1935 |